United States Patent Office 3,637,857
Patented Jan. 25, 1972

3,637,857
METHOD OF OXIDIZING 1,2-DIARYL ETHANOLS WITH NITRIC ACID TO CORRESPONDING KETONES
Jan Magnus Bakke and Christer Lennart Hakansson, Karlskoga, Sweden, assignors to Aktiebolaget Bofors, Bofors, Sweden
No Drawing. Continuation-in-part of abandoned application Ser. No. 747,068, July 24, 1968. This application May 4, 1970, Ser. No. 34,575
Int. Cl. C07c 49/76, 49/80, 41/82
U.S. Cl. 260—590   3 Claims

ABSTRACT OF THE DISCLOSURE 1,2-diaryl-ethanols of the formula

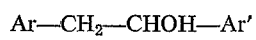

where Ar and Ar[1] are phenyl or substituted phenyl are converted to the corresponding ketones with nitric acid in the presence of an organic solvent which is immiscible with and resistant to oxidation by nitric acid.

---

The present application is a continuation-in-part application of our copending application Ser. No. 747,068, filed July 24, 1968, now abandoned.

This invention relates to a process for the preparation of aryl arylmethyl ketones. It particularly relates to a process for the preparation of such ketones by the oxidation with nitric acid of 1,2-diaryl-ethanols of the formula

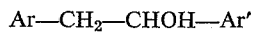

wherein Ar and Ar[1], which may be the same or different, are phenyl or substituted phenyl such as halophenyl, alkylphenyl, alkoxyphenyl, cyanophenyl or carboxyphenyl. The phenyl groups may also carry as substituents other aryl groups such as phenyl or naphthyl. The alkyl and alkoxy substituents are preferably lower alkyl or lower alkoxy containing up to 5 carbon atoms.

In the conventional oxidation of 1,2-diaryl-ethanols in an acid environment, the yield of the desired ketones is low because of competing side reactions as illustrated in the following reaction scheme:

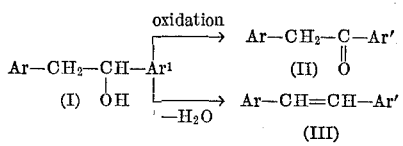

in which I is the starting 1,2-diaryl-ethanol, II the desired ketone, and III the stilbenes formed through a side reaction. In addition to the formation of the undesired stilbenes (III) the reaction was disturbed owing to the fact that both these stilbenes and the ketones (II) formed are subject to oxidation under the conditions utilized.

According to the process of the present invention, it is possible to carry out the oxidation of 1,2-diaryl-ethanols with nitric acid to the desired ketones with a good yield. In the process of this invention the oxidation takes place in the presence of an organic solvent, which is practically immiscible with nitric acid and is not noticeably affected by the acidic oxidizing environment.

Organic solvents which are suitable for use in the process of this invention include halogenated alkanes such as methylene chloride, methylene bromide, chloroform, bromoform, carbon tetrachloride, ethyl bromide, propyl chloride and the like, monocyclic aromatic hydrocarbons such as benzene, toluene, xylene and the like, and halogenated monocyclic aromatic hydrocarbons such as chlorobenzene, chlorotoluenes, bromobenzene and the like.

The invention will now be described in more detail in the following examples which are given by way of illustration and are not to be considered as limiting.

EXAMPLE 1

2.55 g. of 1-phenyl-2-(o-nitro-phenyl) ethanol was dissolved in 6 ml. of chloroform and added dropwise with vigorous stirring into 30 ml. of concentrated nitric acid, to which had been added 0.1 g. of sodium nitrite. 4 hours later, the reaction mixture was poured into water and extracted with chloroform. The chloroform extract was thereafter washed with a sodium bicarbonate solution. After evaporation of the chloroform solution, a residue was obtained which was purified by means of chromatography on a silica gel column. A fraction of 2.5 g. which was thereby obtained, was shown by thin-layer chromatographic analysis to be pure. The I.R. spectrum was that of o-nitro-desoxy-benzoin. The structure of the product was also determined by reduction and conversion to 2-phenyl indole. The yield of the o-nitro-desoxy-benzoin was 98%.

EXAMPLE 2

0.50 g. of 1-phenyl-2-(o-nitro-phenyl) ethanol was added to 10 ml. of concentrated nitric acid, to which had been added 0.1 g. of sodium nitrite. Half an hour after the addition, only unreacted starting material could be found by using thin-layer chromatographic analysis. 10 ml. of water was then added to the reaction mixture, and the temperature was raised to 70° C. A reaction then evidently took place, as a homogeneous solution was formed. The reaction mixture was thereafter cooled and more water was added, after which extraction with ether followed. Upon evaporation of the ether, a residue of 0.13 g. was obtained, which consisted of a mixture of several substances which were difficult to define. This example shows that direct conventional oxidation of diaryl-ethanols with nitric acid does not give the desired ketone, and that undesirable side reactions occur.

EXAMPLE 3

0.2 g. of 1-(p-methoxy-phenyl)-2-(o-nitro-phenyl)-ethanol was dissolved in 7 ml. of chloroform and added dropwise with vigorous stirring into 15 ml. of concentrated nitric acid, to which had been added some grains of sodium nitrite. After 3.5 hours the reaction mixture was poured into water and extracted with chloroform. The chloroform extract was thereafter washed with a sodium bicarbonate solution. Upon evaporation of the chloroform solution there was obtained 0.2 g. of a product and I.R. spectrum proved to be (p-methoxy-phenyl)-(o-nitro-benzyl)-ketone. M.P. 119–20° C.

EXAMPLE 4

0.2 g. of 1-(p-chloro-phenyl)-2-(o-nitro-phenyl)-ethanol was dissolved in 7 ml. of chloroform and added dropwise with vigorous stirring into 15 ml. of concentrated nitric acid, to which had been added some grains of sodium nitrite. After 7 hours the reaction mixture was poured into water and extracted with chloroform. The chloroform extract was thereafter washed with a sodium bicarbonate solution. After evaporation of the chloroform phase a product of 195 mg. was obtained, which on thin-layer chromatographic analysis and I.R. spectrum proved to be (p-chloro-phenyl)-(o-nitro-benzyl)-ketone. M.P. 57–62° C.

EXAMPLE 5

34 mg. of 1-(p-cyano-phenyl)-2-(o-nitro-phenyl)-ethanol was dissolved in 7 ml. of chloroform and added dropwise with vigorous stirring into 10 ml. of concentrated nitric acid, to which had been added some grains of sodium nitrite. After 4.5 hours the reaction mixture was poured into water and extracted with chloroform. The chloroform extract was thereafter washed with a sodium bicarbonate solution. After evaporation of the chloroform a product of 34 mg. was obtained, which on thin-layer chromatographic analysis and I.R. spectrum proved to be (p-cyano-phenyl)-(o-nitro-benzyl)-ketone. M.P. 121.5–123° C.

EXAMPLE 6

The reaction was carried out analogously with that of Example 1 but instead of chloroform the following solvents were used: methylenechloride, carbon tetrachloride, chlorobenzene, benzene and methyl-isobutylketone respectively.

These experiments showed that the four first mentioned solvents gave results as were obtained with chloroform, but the experiment with methyl-isobutyl-ketone failed since the solvent was affected by the nitric acid.

What is claimed is:

1. A process for the preparation of a ketone of the formula $$Ar-CH_2-CO-Ar'$$

wherein Ar and Ar', which may be the same or different, are phenyl, halophenyl, cyanophenyl, nitrophenyl, lower alkylphenyl, or lower alkoxyphenyl, which comprises contacting with concentrated nitric acid a solution of a 1,2-diaryl-ethanol of the formula $$Ar-CH_2-CHOH-Ar'$$

wherein Ar and Ar' are the same as above, in a solvent selected from the group consisting of chloroform, methylene-chloride, carbon tetrachloride, benzene and chlorobenzene.

2. A process according to claim 1 wherein Ar is o-nitrophenyl and Ar' is phenyl.

3. A process according to claim 2 wherein the solvent is chloroform.

References Cited

Bender et al., J. Org. Chem., 23, 410–413 (1958).

DANIEL D. HORWITZ, Primary Examiner

U.S. Cl. X.R.

260—465 R